(12) United States Patent
Williams et al.

(10) Patent No.: US 11,046,161 B2
(45) Date of Patent: Jun. 29, 2021

(54) TONNEAU COVER WITH AIRFLOW PASSAGES EXTENDING BETWEEN DIFFERENT SIDES THEREOF

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 104 days.

(21) Appl. No.: 16/407,858

(22) Filed: May 9, 2019

(65) Prior Publication Data
US 2020/0355434 A1 Nov. 12, 2020

(51) Int. Cl.
*B60J 7/16* (2006.01)
*D06F 57/12* (2006.01)
*B62D 33/04* (2006.01)
*F26B 19/00* (2006.01)

(52) U.S. Cl.
CPC .......... *B60J 7/1607* (2013.01); *B62D 33/042* (2013.01); *D06F 57/125* (2013.01); *F26B 19/005* (2013.01)

(58) Field of Classification Search
CPC ... B60J 7/16; B60J 7/1607; B60P 7/02; B62D 33/0207; B62D 33/04; D06F 57/00; D06F 57/06; D06F 57/125
USPC ....................................... 296/100.01, 100.02
See application file for complete search history.

(56) References Cited

U.S. PATENT DOCUMENTS

| | | | |
|---|---|---|---|
| 5,398,985 A | 3/1995 | Robinson | |
| 5,716,176 A | 2/1998 | Anderson | |
| 6,435,586 B2 * | 8/2002 | Getzschman | B60R 9/00 224/404 |
| 9,381,794 B2 * | 7/2016 | Gomes | B60P 7/06 |
| 9,487,248 B1 * | 11/2016 | Buckhalt | B62D 33/08 |
| 9,682,733 B2 | 6/2017 | Krishnan et al. | |
| 10,112,465 B2 | 10/2018 | Flocco | |
| 2003/0085585 A1 * | 5/2003 | Dicke | B60R 11/06 296/100.16 |
| 2010/0194137 A1 * | 8/2010 | Kealy | B60J 7/1614 296/100.01 |
| 2012/0012548 A1 | 1/2012 | Stringer | |

* cited by examiner

*Primary Examiner* — Jason S Daniels
(74) *Attorney, Agent, or Firm* — Christopher G. Darrow; Darrow Mustafa PC (57) ABSTRACT

A tonneau cover for a vehicle cargo bed includes at least one first airflow passage extending between a first side of the tonneau cover and a second side of the tonneau cover opposite the first side, and at least one second airflow passage separate from the first airflow passage and extending between the second side of the tonneau cover and at least one side of the tonneau cover other than the second side.

11 Claims, 4 Drawing Sheets

TONNEAU COVER WITH AIRFLOW PASSAGES EXTENDING BETWEEN DIFFERENT SIDES THEREOF

The subject matter described herein relates in general to vehicle tonneau covers and, more particularly, to a tonneau cover having airflow passages extending between an exterior of a vehicle cargo bed and the cargo bed.

BACKGROUND

Items of clothing and other items (such as towels, sports equipment, camping gear, etc.) may become wet due to rain or participation of a user in recreational activities. The user may not wish to bring wet items into a vehicle passenger compartment, due to the potential for damage to the vehicle seats and other portions of the interior.

SUMMARY OF THE INVENTION

In one aspect of the embodiments described herein, a tonneau cover for a vehicle cargo bed is provided. The tonneau cover includes at least one first airflow passage extending between a first side of the tonneau cover and a second side of the tonneau cover opposite the first side, and at least one second airflow passage separate from the first airflow passage and extending between the second side of the tonneau cover and at least one side of the tonneau cover other than the second side.

In another aspect of the embodiments described herein, a drying module for a vehicle cargo bed is provided. The drying module includes a first rack support including at least one first rack support surface formed therealong. The first rack support is structured to be coupled to a tonneau cover so that the at least one first rack support surface resides at a first distance from the tonneau cover. A second rack support includes at least one second rack support surface formed therealong. The second rack support is structured to be coupled to the tonneau cover opposite the first rack support such that the at least one second rack support surface also resides at the first distance from the tonneau cover. At least one rack is structured to be supported between the first rack support and the second rack support by the at least one first rack support surface and the at least one second rack support surface when the at least one first rack support surface and the at least one second rack support surface reside at the first distance from the tonneau cover.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

In one or more arrangements described herein, a tonneau cover is provided for a vehicle having a cab and a cargo bed located behind the cab. At least one first airflow passage extends between a first side of the tonneau cover and a second side of the tonneau cover opposite the first side. At least one second airflow passage separate from the first airflow passage extends between the second side of the tonneau cover and at least one side of the tonneau cover other than the second side. While the vehicle is in motion, an airflow may be directed from an exterior of the tonneau cover into the cargo bed, through the first airflow passage. The airflow may transit the cargo bed while flowing from the first airflow passage to a second airflow passage, and may be used for drying items positioned in the cargo bed between the first and second airflow passages. A drying module may be positioned within the cargo bed so as to be within the airflow. The drying module may aid in positioning and securing items to be dried by the airflow. An airflow having transited the cargo bed may exit the cargo bed through the second airflow passage.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

Figure 1:
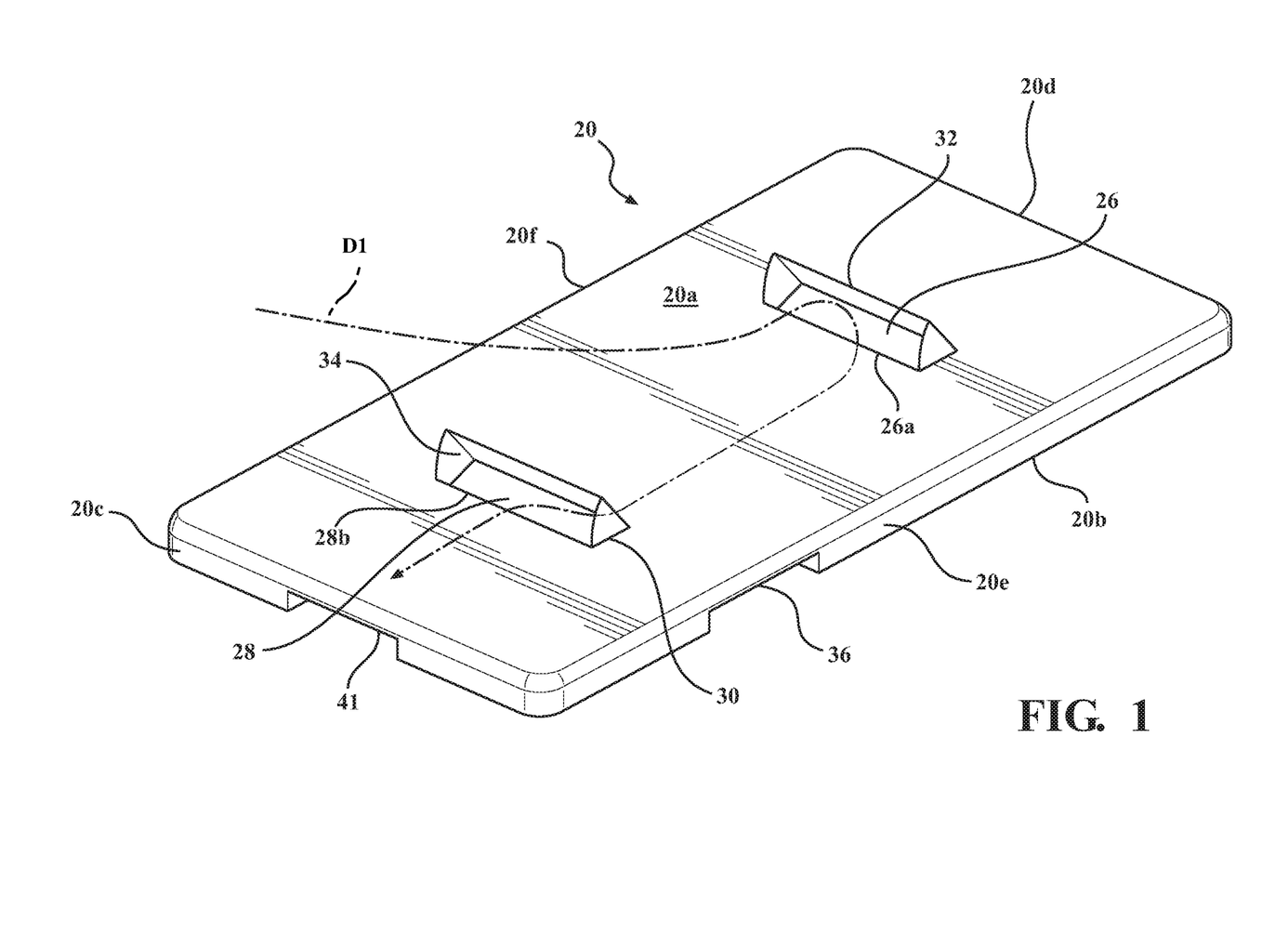
FIG. 1 is a schematic perspective view of a tonneau cover in accordance with an embodiment described herein, showing a first airflow passage and a second airflow passage extending through the tonneau cover.

FIGS. 1-6 show various views and features of a tonneau cover 20 in accordance with embodiments described herein. Referring to FIG. 1, the tonneau cover 20 may have a first side 20a, a second side 20b residing opposite the first side 20a, a third side 20c, a fourth side 20d residing opposite the third side 20c, a fifth side 20e, and a sixth side 20f residing opposite the fifth side 20e. The third side 20c, fourth side 20d, fifth side 20e, and sixth side 20f may form corresponding edges of the tonneau cover 20.

Figure 2:
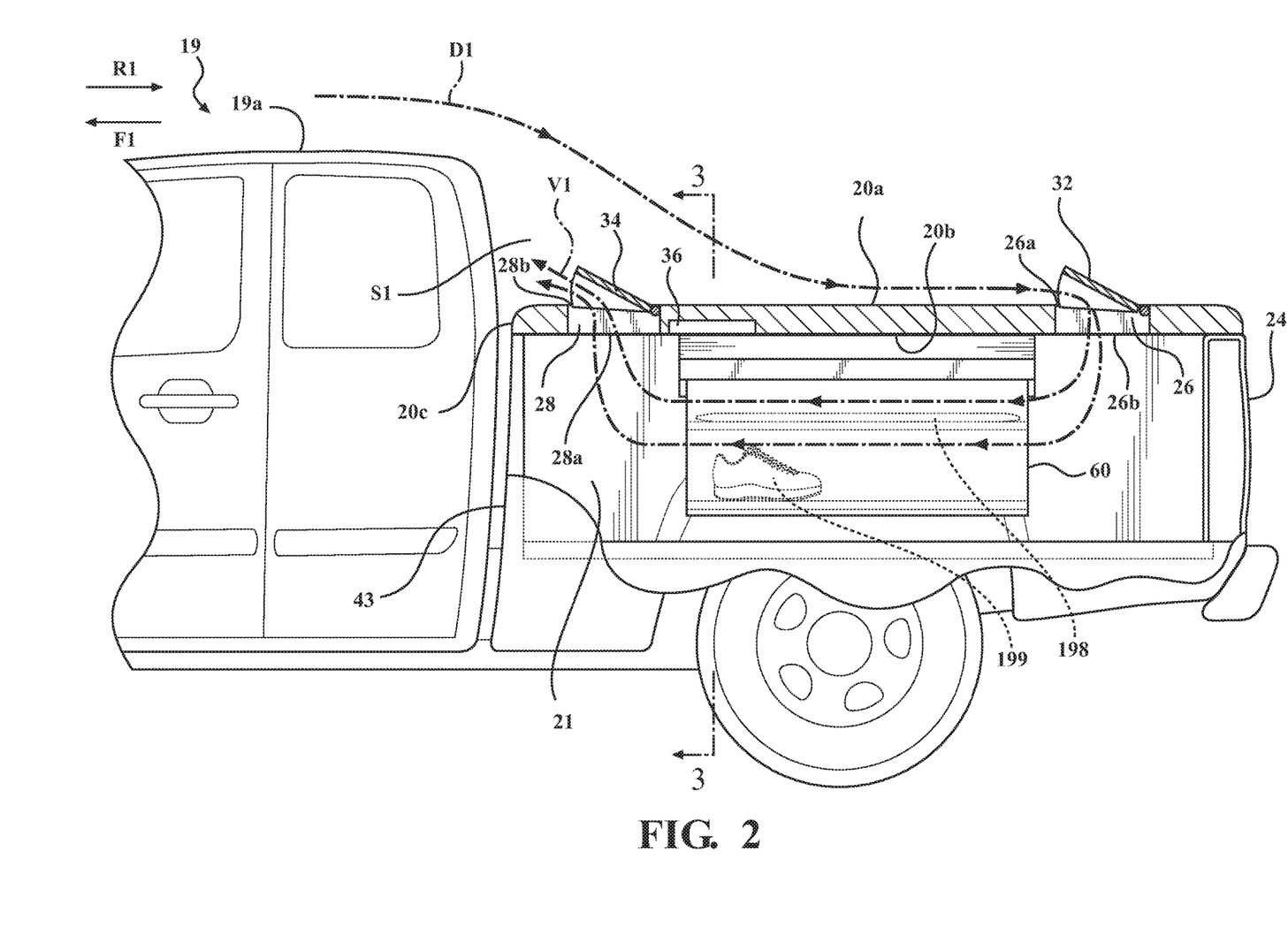
FIG. 2 is a schematic cross-sectional side view of a portion of a vehicle including a tonneau cover as shown in FIG. 1 mounted on the vehicle.

Referring to FIGS. 1 and 2, in one or more arrangements, the first side 20a of the cover 20 may be a side of the tonneau cover structured to form a top or uppermost exteriorly-facing side of the cover 20 when the cover is mounted on a vehicle 19 so as to cover the vehicle cargo bed 21. The second side 20b of the cover 20 may be a side structured to reside above the cargo bed and facing into the cargo bed, thereby forming a bottom side of the cover 20 when the cover 20 is mounted on a vehicle 19 so as to cover the vehicle cargo bed 21.

The third side 20c of the cover 20 may be a side structured to reside closest to a cab 19a or passenger compartment of the vehicle 19, thereby forming a front side or edge of the cover 20 when the cover is mounted on the vehicle 19 so as to cover the vehicle cargo bed 21. The fourth side 20d of the cover 20 may be a side structured to reside opposite the third side 20c and adjacent a rearmost portion of the vehicle 19 or a tailgate 24 of the vehicle when the cover 20 is mounted on the vehicle so as to cover the vehicle cargo bed 21, thereby forming a rear side or edge of the cover 20.

The fifth side 20e of the cover may be a side which extends along a driver's left side of the vehicle 19 when the cover 20 is mounted on the vehicle so as to cover the vehicle cargo bed 21, thereby forming a left side or edge of the cover 20. The sixth side 20f of the cover 20 may be a side which extends along a driver's right side of the vehicle 19 when the cover is mounted on a vehicle so as to cover the vehicle cargo bed 21, thereby forming a right side or edge of the cover 20.

The tonneau cover 20 may be a solid structure or certain portions of the cover may be hollow. In one or more arrangements, the cover 20 may be formed from a plurality of separately-formed panels secured together to form a structure as described herein. The tonneau cover 20 may be formed from any suitable material or materials (for example, polymers, metals, etc.) using any suitable methods, such as molding, forming, etc.

Referring to FIGS. 1 and 2, at least one first airflow passage 26 may extend between the first side 20a of the tonneau cover 20 and the second side 20b of the tonneau cover. The drawings show a single first airflow passage 26. The cover first side 20a may include a first opening 26a structured to serve as an inlet to first airflow passage 26 from an exterior of the vehicle 19. For this purpose, the first opening 26a may be positioned at a location on the first side 20a structured to reside near the rear edge of the tonneau cover 20 when the cover is mounted on the vehicle 19. This positioning may enable the channeling of air flowing over and around the vehicle into the first opening 26a as described herein. Possible locations of the first opening 26a suitable for fluid communication with an airflow streaming over tonneau cover first side 20a may be determined by analysis and/or experimentation using known methods (for example, wind tunnel testing). Although the embodiment of FIGS. 1 and 2 shows a single first airflow passage 26, multiple first airflow passages may be provided for receiving and conveying air into the cargo bed.

The cover second side 20b may include a second opening 26b structured to serve as an outlet of first airflow passage 26 for discharging air from first airflow passage 26 into the cargo bed 21, when the cover 20 is mounted on the vehicle 19 so as to cover the vehicle cargo bed 21. In addition, the tonneau cover 20 may include at least one second airflow passage 28 separate from the first airflow passage 26. The second airflow passage 28 is separate from the first airflow passage 26 in that the two airflow passages are not directly connected (i.e., the passages 26 and 28 do not intersect). The second airflow passage 28 may extend between the second side 20b of the tonneau cover 20 and at least one side of the tonneau cover other than the second side 20b.

In embodiments described herein, the second airflow passage 28 may be structured to enable a discharge of air from the cargo bed 21 to an exterior of the vehicle (i.e., to an atmosphere surrounding the vehicle). The second airflow passage 28 may be structured to discharge air to a relatively low pressure region either behind the cab 19a or adjacent another portion of the vehicle 19, as described herein.

Referring to FIGS. 1 and 2, in one or more arrangements, the side of the tonneau cover 20 other than the second side 20b to which the second airflow passage 28 extends is the cover first side 20a. In such arrangements, the cover second side 20b may include a third opening 28a which may be structured to serve as an inlet from cargo bed 21 into second airflow passage 28 when the cover 20 is mounted on the vehicle 19 so as to cover the vehicle cargo bed 21. The cover first side 20a may also include a fourth opening 28b which may be structured to serve as an outlet from second airflow passage 28 to the tonneau cover first side 20a and an exterior of the vehicle 19, when the cover 20 is mounted on the vehicle so as to cover the vehicle cargo bed 21. For this purpose, the fourth opening 28b may be positioned at a location structured to reside between the first opening 26a and the cab 19a of the vehicle 19, when the tonneau cover 20 is mounted on the vehicle. In particular embodiments, the fourth opening 28b may be positioned at a location structured to reside relatively close to the cab 19a, or within a predetermined distance from a rearmost portion of the cab when the cover 20 is mounted on the vehicle. This positioning may enable the fourth opening 28b to discharge air flowing through the second airflow passage 28 to a relatively low pressure region 51 located behind the vehicle cab 19a as a result of the flow regime around the vehicle 19 and over the tonneau cover 20, thereby facilitating air flow from the second airflow passage 28.

Referring to FIGS. 1 and 2, a first airflow passage door 32 may be attached to another portion of the tonneau cover in association with each first airflow passage 26. First airflow passage door 32 may be operable to (when in an open condition) permit a flow of air from the first side 20a of the tonneau cover 20 into the first airflow passage 26. First airflow passage door 32 may also be operable to (when in a closed condition) block a flow of air from the first side 20a of the tonneau cover 20 into the first airflow passage 26.

In one or more arrangements, the first airflow passage door 32 may be rotatably attached to the remainder of the tonneau cover 20 using a hinge or similar means (not shown). A suitable locking or securement mechanism (not shown) may be provided for securing the first airflow passage door 32 in an open position as shown in FIGS. 1 and 2, to permit air to flow into the first airflow passage 26 through first opening 26a. As well as maintaining the first airflow passage door 32 in a fully open position, the locking mechanism may also be structured to maintain the first airflow passage door 32 in any of a range of "partially" open positions, each of which provides an entrance to the first airflow passage having a smaller cross-sectional area than that provided by the fully-open position of the door 32. This enables a degree of control over the flowrate of air into the first airflow passage 26. The door 32 may be operated manually by a user. The door 32 may have a filter (not shown) mounted along a portion of the door leading into the into the first airflow passage 26, to prevent dust and particulates from entering the airflow passage 26.

The locking or securement mechanism may also be structured to secure the first door 32 in a closed position, to prevent air from flowing into the first airflow passage 26 through first opening 26a, and to provide a smooth outer surface of the tonneau cover 20 for air to flow over when the first airflow passage 26 is not in use. In the closed position, the first door 32 may also prevent rain and snow from entering the airflow passage 26. A weather-tight seal may be provided between the first airflow passage door 32 and the first opening 26a. In one or more arrangements, the first airflow passage door 32 may be structured to "scoop" or direct a flow of air moving over the tonneau cover into the first opening 26a when the door is in an open condition.

In one or more arrangements, a second airflow passage door 34 may be rotatably attached to the remainder of the tonneau cover using a hinge or similar means, to cover the second airflow passage fourth opening 28b. A suitable locking or securement mechanism (not shown) may be provided for securing the second airflow passage door 34 in an open position as shown in FIGS. 1 and 2, to permit air to flow out of the second airflow passage 28 through second airflow passage fourth opening 28b. As well as maintaining the second airflow passage door 34 in a fully open position, the locking mechanism may also be structured to maintain the second airflow passage door 34 in any of a range of partially "open" positions, each of which provides an exit from the second airflow passage 28 having a smaller cross-sectional area than provided by the fully-open position of the door. The door 34 may be operated manually by a user.

The locking or securement mechanism may also be structured to secure the second airflow passage door 34 in a closed position, to prevent air from flowing out of the second airflow passage 28 through fourth opening 28b, and to provide a smooth outer surface of the tonneau cover 20 when the second airflow passage 28 is not in use. In the closed position, the second airflow passage door 34 may also prevent rain and snow from entering the second airflow passage 28. A weather-tight seal may be provided between the second airflow passage door 34 and the second airflow passage fourth opening 28b.

In one example of a locking mechanism usable for the doors 32 and 34 described herein, a hinge or shaft connecting the door to the remainder of the tonneau cover may be coupled to a spiral wound spring or another type of spring. The spiral spring may be structured to bias the door toward the closed condition. A ratchet may be attached to the shaft, and a spring-loaded pawl may be rotatably mounted to the remainder of the tonneau cover adjacent the door. The ratchet and pawl may be engageable to hold the door in any one of several partially open configurations as a user rotates the door and ratchet against the biasing force of the spring. The user may manually disengage the pawl in a known manner to allow the spring to close the door.

In one or more arrangements, the second airflow passage door 34 may be structured to be operable to direct a flow of air from the second airflow passage 28 in a direction away from the first airflow passage 26 (for example, in a direction toward the cab 19a) as shown in FIG. 2. This may aid in preventing disruption of the airstream flowing over the tonneau cover 20 toward the first airflow passage 26 by air being discharged from the second airflow passage 28 when there is a high volumetric flowrate of air cycling through the cargo bed 21. While the drawings show the second airflow passage discharge airflow being directed in a forward direction F1 of the vehicle toward the cab (as indicated by arrows V1), air from the second airflow passage airflow may alternatively be discharged in any desired direction, including a direction toward the first airflow passage 26.

Figure 3:
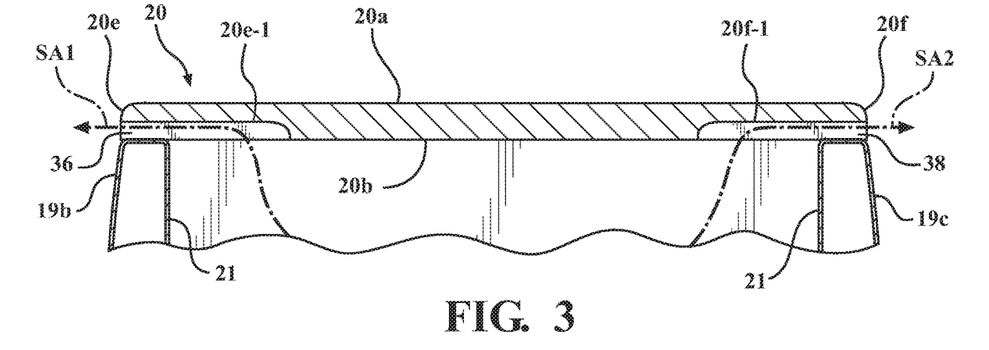
FIG. 3 is a schematic cross-sectional view of a portion of an embodiment of a tonneau cover described herein, showing airflow passages formed between the tonneau cover and left and right sidewalls of the cargo bed.

Referring to FIG. 3, in one or more alternative arrangements, the side of the tonneau cover 20 other than the second side 20b to which the second airflow passage extends is a side edge of the tonneau cover (i.e., one or more of the fifth (left) side 20e and the sixth (right) side 20f of the tonneau cover). Thus, when the tonneau cover 20 is mounted on the vehicle 19 so as to cover the cargo bed 21, air from the cargo bed 21 may enter (and be discharged through) a second airflow passage in the form of a passage 36 formed between the tonneau cover 20 and a left sidewall 19b of the cargo bed, as indicated by arrow SA1. Air from the cargo bed 21 may also (or alternatively) enter (and be discharged through) another second airflow passage 38 formed between the tonneau cover 20 and a right sidewall 19c of the cargo bed, as indicated by arrow SA2. The airflow passages 36 and 38 may be in the form of cavities formed along respective side edge(s) 20e and 20f of the tonneau cover 20 and may be structured to enable air to flow out of the cargo bed 21 between top surfaces of the sidewalls 19b, 19c and recessed surfaces 20e-1 and 20f-1 of respective side edges 20e and 20f.

The airflow passages 36 and 38 may discharge air to sides of the tonneau cover 20 residing in airstreams flowing along the sides of the vehicle 19 when the vehicle is moving. These moving airstreams may form relatively lower pressure regions adjacent the side edges of the vehicle and tonneau cover, thereby facilitating airflow from the second airflow passage(s) 36 and/or 38 to the vehicle exterior. Slidable, rotatable or otherwise actuatable doors (not shown) may be incorporated into the tonneau cover 20 to enable the airflow passages 36 and 38 to be opened and closed as desired. The doors and their mountings may be structured to provide weather-tight seals between the tonneau cover 20 and the sidewalls 19b, 19c. The airflow passages 36 and 38 may both be provided in the tonneau cover, or either of airflow passages 36 and 38 may be provided alone.

Figures 4, 5A:
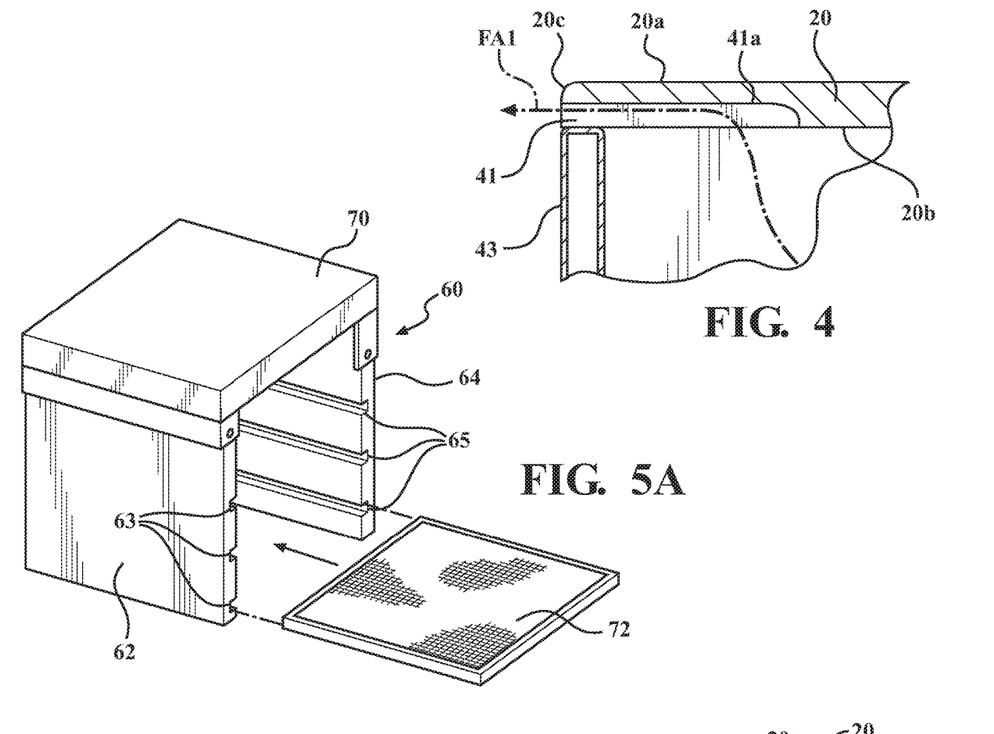
FIG. 4 is a schematic cross-sectional view of a portion of an embodiment of a tonneau cover described herein, showing an airflow passage formed between the tonneau cover and a front wall of the cargo bed.
FIG. 5A is a schematic perspective view of a drying module for a vehicle cargo bed, in accordance with an embodiment described herein.

Referring to FIG. 4, in one or more other alternative arrangements, the side of the tonneau cover other than the second side to which the second airflow passage extends is the front side 20c of the tonneau cover 20. Thus, when the tonneau cover 20 is mounted on the vehicle 19 so as to cover the cargo bed 21, air from the cargo bed 21 may enter a second airflow passage in the form of a passage 41 formed between the tonneau cover 20 and the front wall 43 of the cargo bed and may be discharged to the vehicle external environment through the front side 20c of the tonneau cover, as indicated by arrow FA1. The airflow passage 41 may be in the form of a cavity formed along the front edge 20c of the tonneau cover 20 and structured to enable air to flow out of the cargo bed 21 between the top surface of the cargo bed front wall 43 and a recessed surface 41a along the tonneau cover front edge 20c opposite the front wall 43. The airflow passage 41 may discharge air to the relatively static air pocket residing just behind the vehicle cab 19a. This air pocket may form a relatively lower pressure region, thereby facilitating airflow from the airflow passage 41. A slidable, rotatable or otherwise actuatable door (not shown) may be mounted to the remainder of the tonneau cover 20 to enable the opening airflow passage 41 to be opened and closed as desired. This door and its mountings may be structured to provide a weather-tight seal with the airflow passage 41.

An embodiment of the tonneau cover described herein may have single second airflow passage or multiple second airflow passages at associated locations on the tonneau cover as described herein, with each second airflow passage designed to discharge air from the cargo bed 21 to the exterior environment of the vehicle 19.

Referring now to FIGS. 5A-5D, a drying module (generally designated 60) may be attached to the tonneau cover second side 20b to enable the drying of articles positioned in the cargo bed 21. The articles (such as clothing 198, shoes 199, etc.) may be positioned in the drying module 60 and dried by streams of air circulating through the cargo bed 21 via the first and second airflow passages described herein.

In one or more arrangements, the drying module 60 may include a first rack support 62 structured to be coupled to the second side 20b of the tonneau cover, so as to extend into the cargo bed 21. The first rack support 62 may include at least one first rack support surface 66 formed therealong. In one or more arrangements, the first rack support surfaces 66 may be formed by edges of grooves 63 extending into and along the first rack support 62. The embodiment in FIGS. 5A-5D shows a first rack support 62 with three rack support surfaces 66a-66c.

In addition, the drying module may include a second rack support 64 structured to be coupled to the second side 20b of the tonneau cover 20 opposite the first rack support 62. The second rack support 64 may include at least one second rack support surface 68 formed therealong. In one or more arrangements, the second rack support surfaces 68 may be formed by edges of grooves 65 extending into and along the second rack support 64. The embodiment in FIGS. 5A-5D shows a second rack support with three rack support surfaces 68a-68c.

Figure 5B:
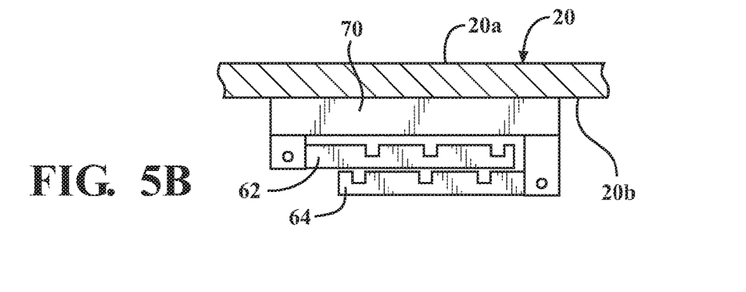
FIG. 5B is a schematic end view of a portion of the drying module of FIG. 5A, showing rack supports of the drying module in stowed configurations.
Figure 5C:
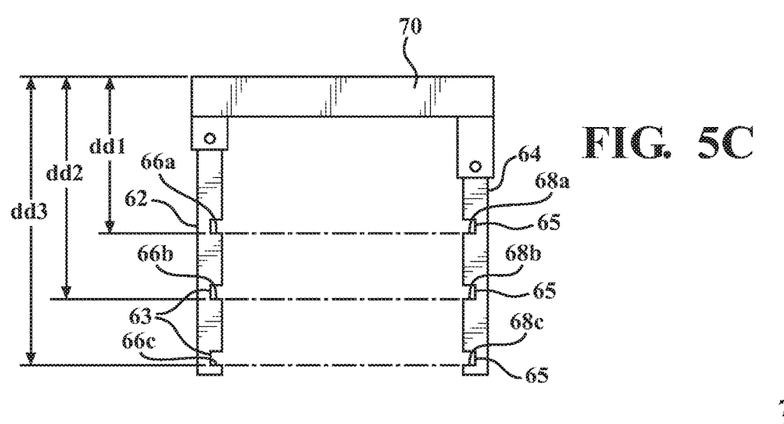
FIG. 5C is the schematic end view of FIG. 5B showing the rack supports of the drying module in end-use or support configurations.

Referring to FIG. 5C, the first and second rack supports 62, 64 may be dimensioned with respect to each other and coupled to the tonneau cover second side so that rack support surfaces of pairs of rack support surfaces reside at the same (or substantially the same) distances from the tonneau cover when the rack supports are in their end-use positions. Thus, for example, both of rack support surfaces 66a, 68a may reside at a distance of dd1 from the tonneau cover second side 20b. Also, both of rack support surfaces 66b, 68b may reside at a distance of dd2 from the tonneau cover second side 20b. Also, both of rack support surfaces 66c, 68c may reside at a distance of dd3 from the tonneau cover second side 20b.

As used herein, the term "substantially" includes exactly the term it modifies and slight variations therefrom. Thus, the term "substantially the same distance" means exactly the same distance and slight variations therefrom. In this particular example, slight variations therefrom can include variations in the range of 0-1 inch. For example, rack support surface 66a may reside at a distance of 6 inches from tonneau cover second surface 20b, while associated rack support surface 68a resides at a distance of 6.3 inches from the tonneau cover second surface 20b. The rack supports may be designed and attached to the tonneau cover so that racks 72 inserted into the rack supports may be horizontal or substantially horizontal.

The embodiment shown in FIGS. 5A-5D shows three sets of opposed rack support surfaces formed along sides of the first and second rack supports 62, 64. However, a different number of sets of opposed rack support surfaces may be formed in the first and second rack supports.

In one or more arrangements, the rack supports 62, 64 may be mounted directly to the tonneau cover second side 20b. In other arrangements, the rack supports 62, 64 may be mounted to the tonneau cover second side 20b using a mounting base 70 attachable to the tonneau cover. The rack supports 62, 64 may be coupled to the mounting base 70 so as to be rotatable as shown in FIGS. 5B and 5C to enable the rack supports to be rotated to stowed configurations when not being used. The rack supports 62, 64 may be secured in their stowed configurations by any suitable method, for example, using one or more latches or an elastic cord extendible between opposite sides of the mounting base 70.

Figure 5D:
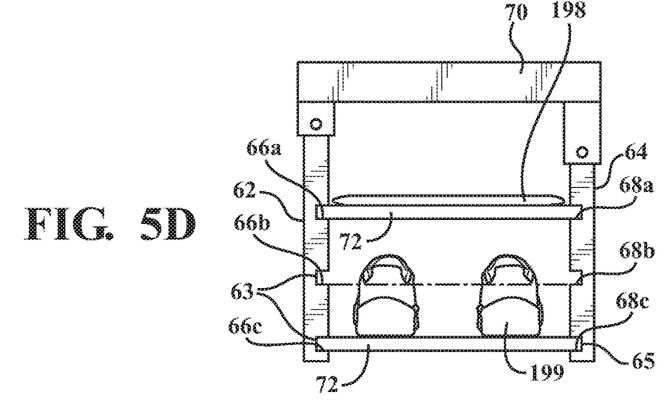
FIG. 5D is the schematic end view of FIG. 5C showing the rack supports of the drying module supporting a rack inserted between the rack supports.

When it is desired to use the drying module, the rack supports 62, 64 may be rotated to the configuration shown in FIG. 5C. One or more racks 72 may then be inserted between the rack supports 62, 64 such that each side edge of a rack 72 rests on an associated rack support surface of a rack support, as shown in FIG. 5D. The rack widths may be sized with respect to the rack support positions and dimensions such that a slight laterally-extending interference fit is formed between each rack 72 and the rack supports 62, 64 when each side edge of a rack 72 rests on an associated rack support surface of a rack support. This condition may aid in maintaining positioning of the racks 72 between the rack supports 62, 64 and may promote rigidity of the drying module responsive to airflow.

Figure 6:
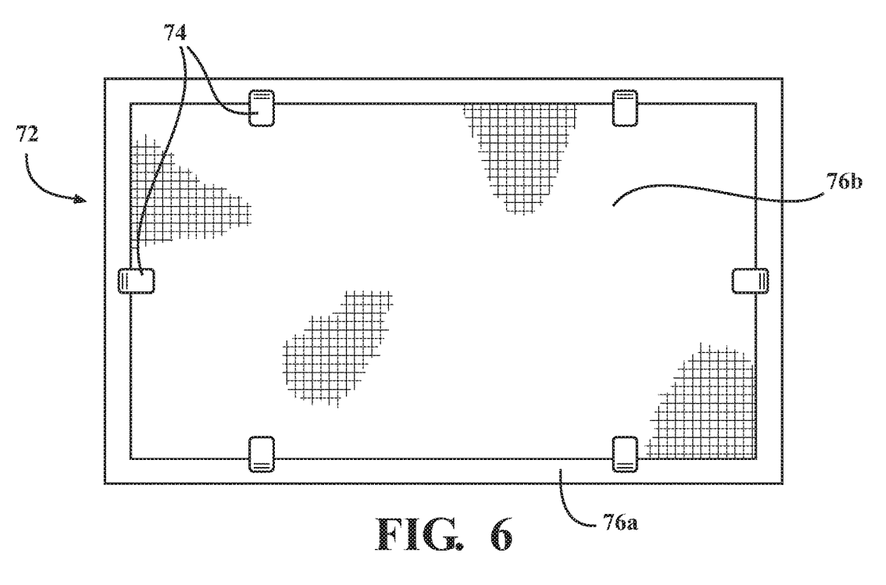
FIG. 6 is schematic plan view of one embodiment of a drying rack usable in the drying module shown in FIGS. 5A-5D.

Referring now to FIG. 6, a rack 72 usable for the purposes described herein may include a frame 76a supporting a perforated center portion 76b. The center portion 76b may have a porous structure and may be formed from a mesh material or any other material which allows air circulating through the cargo bed to reach a side of an article in contact with the rack, for drying purposes. Lateral edges of racks 72 may be structured to slidably fit within grooves 63, 65 formed in respective rack supports 62, 64 so that each rack lateral edge is supported by an associated rack support surface. The grooves 63, 65 may be spaced apart so as to enable air to flow both above and below each rack 72 when the racks are mounted in the rack supports 62, 64.

Referring again to FIG. 6, at least one object positioning feature 74 may be positioned on frame 76a. The object positioning feature(s) 74 may be designed to help secure an object in a desired location or configuration on the rack 72. For example, items such as articles of clothing, shoes, beach towels, etc. may be positioned on the rack 72 for drying by a stream of air circulating through the cargo bed 21. The object positioning feature(s) 74 may include clips, stanchions, and/or any of a variety of other mechanisms which may be used to secure (or aid in securing) objects on the rack 72. For example, clips attached to certain locations on the rack 72 may be used to grasp portions of a clothing item, to spread and maintain the clothing item in a configuration which facilitates drying. Alternatively, the object positioning feature(s) 74 may be detachable from the rack and individually positionable on the rack 72. For example, individual ones of the object positioning feature(s) 74 may be attachable to any of a variety of locations on the rack, using hook-and-loop fasteners or other types of fasteners.

Operation of the drying module 60 will now be discussed with reference to the drawings.

Drying module 60 may be attached to a location on tonneau cover second side 20b. Referring to FIGS. 2 and 5A-5D, with the tonneau cover 20 mounted on the vehicle 19 so as to cover the cargo bed 21, the drying module 60 may be accessed from the rear of the vehicle 19 by opening the tailgate 24. The rack supports 62, 64 may then be released from their stowed configurations shown in FIG. 5B and rotated into their end-use configurations shown in FIG. 5C. Racks 72 may then be inserted between the rack supports 62, 64 in desired positions for supporting articles to be dried. If desired, articles of clothing may be spread out on the racks and secured in place using object positioning features 74 as previously described, prior to positioning the racks 72 between the rack supports 62, 64.

After the racks 72 have been mounted on the rack supports 62, 64, selected door(s) of the tonneau cover 20 may be opened as previously described to admit air into one or more first airflow passage(s) (such as first airflow passage 26), and selected door(s) may be opened to provide airflow discharge path(s) through one or more second airflow passage(s) (such as second airflow passage 28) as the vehicle 19 moves along a road.

Referring again to FIGS. 1 and 2, as the vehicle 19 moves, air generally flows over and around the vehicle in a pattern indicated by arrow D1. The airflow may proceed over the vehicle cab 19*a*, then down onto the tonneau cover 20. A portion of the airflow D1 may impinge upon the open first airflow passage door 32 and be directed into the first opening 26*a*. Due to the airflow pattern over the vehicle 19, a relatively static, low-pressure region 51 may be formed just behind the cab 19*a*. The tonneau cover 20 may be structured such that the second airflow passage fourth opening 28*b* resides in this low-pressure region 51 when the tonneau cover 20 is mounted on the vehicle 19.

Airflow may proceed through the first airflow passage 26 following the path indicated by arrow D1, into the cargo bed 21 and toward the second airflow passage 28 and out through the second airflow passage. The air may flow both below and over the racks 72 and the objects secured thereto, to dry the objects. Positioning of the second airflow passage 28 in the region 51 which is at low pressure during vehicle movement facilitates airflow out of the cargo bed through the second airflow passage 28. In addition, in one or more arrangements, second airflow passage door 34 may be structured to direct the discharge airflow in a direction away from the first airflow passage 26 and generally toward the cab 19*a*. This may help prevent any interruption of the airflow over the cab 19*a* and toward the first airflow passage 26, due to air being discharged from the second airflow passage 28. If it is desired for air to be discharged from the cargo bed through one of the side airflow passages 36, 38 or through the front opening 41 instead of through an opening in the top of the tonneau cover, the door 34 may remain closed and a door controlling flow through the desired opening may be opened.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A drying module for a vehicle cargo bed, the drying module comprising:
   a first rack support structured to be coupled to a tonneau cover and to be positionable so that a first rack support surface on the first rack support resides at a first distance from the tonneau cover; and
   a second rack support structured to be coupled to the tonneau cover and to be positionable so that a second rack support surface on the second rack support resides at the first distance from the tonneau cover and opposite the first rack support surface,
   each of the first rack support and second rack support including at least one groove formed therealong, the at least one groove defining a rack support surface.

2. The drying module of claim 1 wherein the first rack support and the second rack support are structured to be coupled to the tonneau cover so as to be rotatable with respect to the tonneau cover.

3. The drying module of claim 2 wherein the first rack support and the second rack support are rotatably mounted to a mounting base structured to be attached to the tonneau cover.

4. The drying module of claim 2 wherein the first rack support and the second rack support are structured to be rotatable with respect to the tonneau cover to respective stowed positions in which one of the first rack support and the second rack support overlaps the other one of the first rack support and the second rack support.

5. The drying module of claim 1 further comprising a first rack structured to be supported between the first rack support and the second rack support by the first rack support surface and the second rack support surface when the first rack support surface and the second rack support surface reside at the first distance from the tonneau cover.

6. The drying module of claim 5 wherein the first rack is structured so that an interference fit is formed between the first rack and the first rack support and between the first rack and the second rack support when the first rack is supported by the first rack support surface and the second rack support surface.

7. The drying module of claim 1 wherein the first rack support is structured to be positionable so that another first rack support surface on the first rack support resides at a second distance from the tonneau cover different from the first distance, and the second rack support is structured to be positionable so that another second rack support surface on the second rack support resides at the second distance from the tonneau cover and opposite the other first rack support surface.

8. An assembly comprising:
   a tonneau cover for a vehicle cargo bed; and
   the drying module in accordance with claim 1 coupled to the tonneau cover.

9. The assembly of claim 8 wherein the tonneau cover has a first airflow passage extending therethrough and a second airflow passage extending therethrough and spaced apart from the first airflow passage, and wherein the drying module is coupled to the tonneau cover between the first airflow passage and the second airflow passage.

10. An assembly comprising:
    a tonneau cover for a vehicle cargo bed; and
    a drying module coupled to the tonneau cover, the drying module including a first rack support structured to be coupled to a tonneau cover and to be positionable so that a first rack support surface on the first rack support resides at a first distance from the tonneau cover, and a second rack support structured to be coupled to the tonneau cover and to be positionable so that a second rack support surface on the second rack support resides at the first distance from the tonneau cover and opposite the first rack support surface, wherein the tonneau cover has a first airflow passage extending therethrough and a second airflow passage extending therethrough and spaced apart from the first airflow passage, and wherein the drying module is coupled to the tonneau cover between the first airflow passage and the second airflow passage.

11. A drying module for a vehicle cargo bed, the drying module comprising:
- a first rack support structured to be coupled to a tonneau cover and to be positionable so that a first rack support surface on the first rack support resides at a first distance from the tonneau cover;
- a second rack support structured to be coupled to the tonneau cover and to be positionable so that a second rack support surface on the second rack support resides at the first distance from the tonneau cover and opposite the first rack support surface; and
- a first rack structured to be supported between the first rack support and the second rack support by the first rack support surface and the second rack support surface when the first rack support surface and the second rack support surface reside at the first distance from the tonneau cover,
- the first rack being structured so that an interference fit is formed between the first rack and the first rack support and between the first rack and the second rack support when the first rack is supported by the first rack support surface and the second rack support surface.

* * * * *